(12) United States Patent
Yi et al.

(10) Patent No.: US 9,414,086 B2
(45) Date of Patent: Aug. 9, 2016

(54) PARTIAL FRAME UTILIZATION IN VIDEO CODECS

(75) Inventors: Feng Yi, San Jose, CA (US); David R. Conrad, Sunnyvale, CA (US); Chris Y. Chung, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 456 days.

(21) Appl. No.: 13/487,498

(22) Filed: Jun. 4, 2012

(65) Prior Publication Data

US 2012/0307904 A1 Dec. 6, 2012

Related U.S. Application Data

(60) Provisional application No. 61/493,450, filed on Jun. 4, 2011.

(51) Int. Cl.

| | |
|---|---|
| *H04N 7/32* | (2006.01) |
| *H04N 19/55* | (2014.01) |
| *H04N 19/176* | (2014.01) |
| *H04N 19/46* | (2014.01) |
| *H04N 19/61* | (2014.01) |
| *H04N 19/103* | (2014.01) |
| *H04N 19/117* | (2014.01) |
| *H04N 19/124* | (2014.01) |
| *H04N 19/156* | (2014.01) |
| *H04N 19/164* | (2014.01) |
| *H04N 19/17* | (2014.01) |
| *H04N 19/167* | (2014.01) |

(Continued)

(52) U.S. Cl.
CPC ............. *H04N 19/55* (2014.11); *H04N 19/103* (2014.11); *H04N 19/117* (2014.11); *H04N 19/124* (2014.11); *H04N 19/156* (2014.11); *H04N 19/164* (2014.11); *H04N 19/167* (2014.11); *H04N 19/17* (2014.11); *H04N 19/176* (2014.11); *H04N 19/46* (2014.11); *H04N 19/61* (2014.11); *H04N 19/29* (2014.11); *H04N 19/85* (2014.11)

(58) Field of Classification Search
CPC ....................................................... H04N 7/32
See application file for complete search history.

(56) References Cited

U.S. PATENT DOCUMENTS

| | | | |
|---|---|---|---|
| 2004/0001220 A1* | 1/2004 | Gorday et al. | ............... 358/1.15 |
| 2006/0098738 A1* | 5/2006 | Cosman et al. | .......... 375/240.16 |

(Continued)

OTHER PUBLICATIONS

Ahmad et al., "Video Transcoding: An Overview of Various Techniques and Research Issues," IEEE Transactions on Multimedia, 7(5): 793-804 (Oct. 2005).

(Continued)

*Primary Examiner* — Dave Czekaj
*Assistant Examiner* — Nam Pham
(74) *Attorney, Agent, or Firm* — Baker & Hostetler, LLP

(57) ABSTRACT

Embodiments of the present invention provide techniques for efficiently coding/decoding video data during circumstances where a decoder only requires or utilizes a portion of coded frames. A coder may exchange signaling with a decoder to identify unused areas of frames and prediction modes for the unused areas. An input frame may be parsed into a used area and an unused area based on the exchanged signaling. If motion vectors of the input frame are not limited to the used areas of the reference frames, the unused area of the input frame may be coded using low complexity. If the motion vectors of the input frame are limited to the used areas of the reference frames, the pixel blocks in the unused area of the input frame may not be coded, or the unused area of the input frame may be filled with gray, white, or black pixel blocks.

29 Claims, 6 Drawing Sheets

(51) Int. Cl.
   *H04N 19/29*     (2014.01)
   *H04N 19/85*     (2014.01)

(56)            References Cited

U.S. PATENT DOCUMENTS

2006/0133502 A1*   6/2006   Lee et al. ................ 375/240.16
   2006/0204113 A1    9/2006   Wang et al.
   2006/0215766 A1    9/2006   Wang et al.
   2006/0238445 A1*  10/2006   Wang et al. .................... 345/55
   2007/0091997 A1*   4/2007   Fogg et al. ................ 375/240.1

2008/0165861 A1*   7/2008   Wen et al. ................ 375/240.26
   2010/0046631 A1    2/2010   Raveendran
   2011/0032986 A1*   2/2011   Banger .......... H04N 21/234363
                                                          375/240.07
   2011/0194613 A1*   8/2011   Chen et al. ............... 375/240.24

OTHER PUBLICATIONS

Kamnoonwatana et al., "Exploiting MPEG-7 Texture Descriptors for Fast H.264 Mode Decision," Department of Electrical & Electronic Engineering, University of Bristol, Bristol, UK, IEEE, pp. 2796-2799 (2008).

* cited by examiner

100

300

500

600

PARTIAL FRAME UTILIZATION IN VIDEO CODECS

CROSS REFERENCE TO RELATED APPLICATIONS

This application claims the benefit of priority to previously filed U.S. provisional patent application Ser. No. 61/493,450 filed Jun. 4, 2011, entitled PARTIAL FRAME UTILIZATION IN VIDEO CODECS. That provisional application is hereby incorporated by reference in its entirety.

BACKGROUND

Aspects of the present invention relate generally to the field of video processing, and more specifically to a predictive video coding system.

In video coding systems, an coder may code a source video sequence into a coded representation that has a smaller bit rate than does the source video and, thereby achieve data compression. A decoder may then invert the coding processes performed by the coder to reconstruct the source video for display or storage.

The transmission of video data from a video source to a display in a communication system involves several steps that may consume significant system resources and network bandwidth. However, in some instances, although a complete frame is received and decoded at the receiving terminal, only a portion of a received frame is displayed. In such cases, the resources utilized to code and decode the unused portion of the frame will have been needlessly wasted. Therefore, the inventors perceive a need in the art to preserve system resources by minimizing the use of encoding and decoding resources for un-displayed or unused portions of a frame.

DETAILED DESCRIPTION

Embodiments of the present invention provide techniques for efficiently coding/decoding video data during circumstances where a decoder only requires or utilizes a portion of coded frames. According to the embodiments, a coder may exchange signaling with a decoder to identify unused areas of frames and prediction modes for the unused areas. The coder may parse an input frame into a used area and an unused area based on the exchanged signaling. The pixel blocks of the used area may be coded according to motion compensated prediction. The coder may determine if motion vectors of the input frame are limited to used areas of reference frames based on the exchanged signaling. If motion vectors of the input frame are not limited to the used areas of the reference frames, the unused area of the input frame may be coded using low complexity. If the motion vectors of the input frame are limited to the used areas of the reference frames, the pixel blocks in the unused area of the input frame may not be coded, or the unused area of the input frame may be filled with gray, white, or black pixel blocks.

In an embodiment, a coder may exchange signaling with a decoder defining an initial size of frames to be coded during a video coding session. The frames of the video coding session may be coded according to predictive coding techniques. The frames may match the initial size. At some point during the video coding session, the coder may exchange signaling with the decoder defining an effective size of frames to be coded. The effective size of the frames may be smaller than the initial size. After the effective size is defined, subsequently-processed frames may be coded according to predictive coding techniques. The subsequently processed frames may match the initial size. The image content of the subsequently processed frames in an area outside the effective size may be altered to reduce its image quality as compared to image content in an area inside the effective size.

In an embodiment, a decoder may exchange signaling with a coder defining an initial size of frames to be coded during a video coding session. The coded frames of the video coding session may be decoded according to predictive decoding techniques. The frames may match the initial size. At some point during the video coding session, the decoder may exchange signaling with the coder defining an effective size of frames to be coded. The effective size of the frames may be smaller than the initial size. After the effective size is defined, subsequently-processed coded frames may be decoded according to predictive decoding techniques. The subsequently decoded frames may match the initial size. The decoder may output decoded frames at the effective size, and may store, in a reference picture cache, decoded frames at the initial size.

Figure 1:
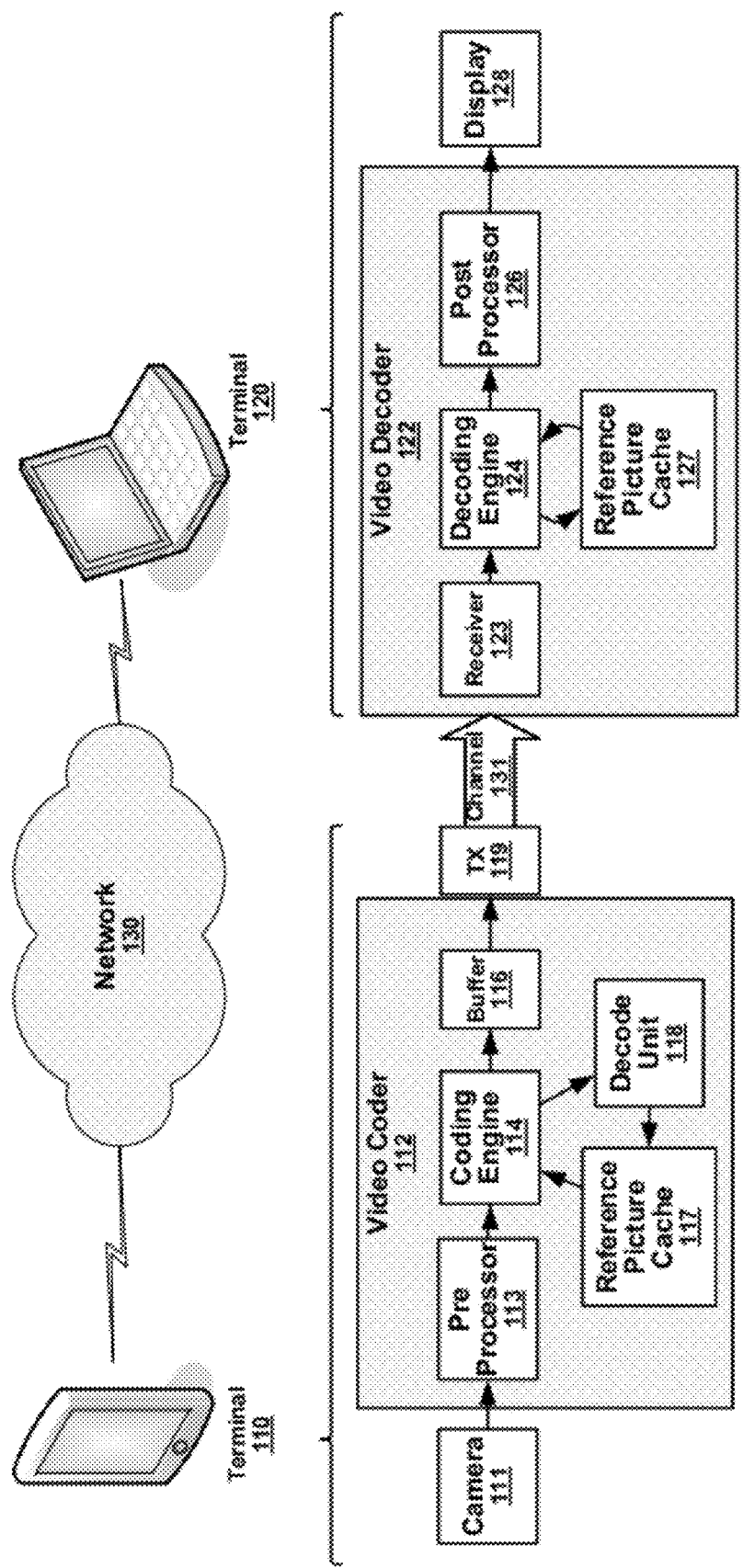
FIG. 1 is a simplified block diagram of a video coding system according to an embodiment of the present invention.

FIG. 1 is a simplified block diagram of a video coding system 100 according to an embodiment of the present invention. The system 100 may include a plurality of terminals 110, 120 interconnected via a network 130. The terminals 110, 120 each may capture video data at a local location and code the video data for transmission to the other terminal via the network 130. Each terminal 110, 120 may receive the coded video data of the other terminal from the network 130, reconstruct the coded data and display video data recovered therefrom.

In FIG. 1, the terminals 110, 120 are illustrated as a smart phone and a laptop computer but the principles of the present invention are not so limited. Embodiments of the present invention find application with personal computers (both desktop and laptop computers), tablet computers, handheld computing devices, computer servers, media players and/or dedicated video conferencing equipment.

The network 130 represents any number of networks that convey coded video data between the terminals 110, 120, including for example wireline and/or wireless communication networks. The communication network 130 may exchange data in circuit-switched or packet-switched channels. Representative networks include telecommunications networks, local area networks, wide area networks and/or the Internet. For the purposes of the present discussion, the architecture and topology of the network 130 are immaterial to the operation of the present invention unless explained herein below.

The terminal 110 may include a camera 111, a video coder 112, and a transmitter 119. The camera 111 may capture video at a local location for coding and delivery to the other terminal 120. The video coder 112 may code video from the camera 111. Coded video is typically smaller than the source video (they consume fewer bits). A transmitter 119 may build a channel stream from the coded video data and other data to be transmitted (coded audio, control information, etc.) and may format the channel stream for delivery over the network 130.

The video coder 112 may include a pre-processor 113, a coding engine 114, a buffer 116, a reference picture cache 117, and a decode unit 118. The pre-processor 113 may accept source video from the camera 111 and may perform various processing operations on the source video to condition it for coding. The coding engine 114 may code processed frames according to a variety of coding modes to achieve bandwidth compression. The buffer 116 may store the coded data until it is combined into a common bit stream to be delivered by the transmission channel 131 to a decoder 122 or terminal 120. The decode unit 118 may reconstruct the compressed video and the reconstructed frames of video may be stored in a reference picture cache 117 to serve as sources of prediction for later-received frames input to the video coder 112.

The pre-processor 113 may receive source video from the camera 111 and may separate the source video into frames. The pre-processor 113 may perform video processing operations on the frames including filtering operations such as de-noising filtering, bilateral filtering or other kinds of processing operations that improve efficiency of coding operations performed by the coder 112. As part of its processing, the pre-processor 113 may analyze and condition the source video for more efficient compression.

The coding engine 114 may code input video according to motion-compensated prediction. As part of its operation, the coding engine 114 may select a coding mode from a variety of coding modes, to code each frame of input the video data. In some video coding systems, a coder may conventionally code each portion of an input video sequence (for example, each pixel block) according to multiple coding modes, may examine the results, and may select a final coding mode for the respective portion. For example, the coding engine might code the pixel block according to a variety of prediction coding techniques, decode the coded block and estimate whether distortion induced in the decoded block by the coding process would be perceptible. The coding engine 114 may output coded video data to the buffer 116.

The decoding unit 118 may parse the coded video data to recover the original source video data, for example by decompressing the frames by inverting coding operations performed by the coding engine 114. Reconstruction of frames may additionally include post-processing operations, such as by interpolation or by a loop filter, to complete the representation of the original video image within the frame. The decoding unit 118 may process the coded video data in the same manner as a decoding engine 124 at a receiving terminal 120 by creating reconstructed frames. The reconstructed frames may represent frames as the decoder 122 will create them from the coded video data. By decoding the coded video data at the coder 112, the coder 112 will obtain copies of reconstructed reference frames that are identical to those obtained by the decoder 120 absent some type of channel error. The reconstructed frames may additionally be used to evaluate a final coding mode for each frame as determined by the coding engine 114.

The reference picture cache 117 may store a predetermined number of reconstructed reference frames. The reference picture cache 117 may have a predetermined cache depth; for example, video coders operating in accordance with H.264 may store up to sixteen (16) reconstructed reference pictures.

The transmitter 119 may transmit the coded video data to the channel 131. In the process, the transmitter 119 may multiplex the coded video data with other data to be transmitted such as coded audio data and control data (provided by processing sources that are not illustrated in FIG. 1). The transmitter 119 may format the multiplexed data into a format appropriate for the network 130 and transmit the data to the network 130.

The terminal 120 may include a video decoder 122 and a display 128. The video decoder 122 may decode coded video received from the channel 131. The display 128 may display the decoded video. In some implementations, a terminal 120 need not include a display; it may store reconstructed video for later use.

The video decoder 122 may include a receiver 123, a decoding engine 124, a post-processor 126, and a reference picture cache 127. The receiver 123 may receive coded video data from the channel 131 and store the received data to be decoded by the decoding engine 124. The decoding engine 124 may decode the coded video data to recover the original source video data. The post-processor 126 may apply other signal conditioning operations to the recovered video prior to output. For example, the post-processor 126 may apply filtering, de-interlacing, scaling or other processing operations on the decompressed sequence that may improve the quality of the video displayed. The processed video data may be displayed on a screen or other display 128 or may be stored in a storage device (not shown) for later use.

The reference picture cache 127 may store frame data that may represent sources of prediction for later-received frames input to the video decoding system. That is, recovered video of reference frames may be stored in the reference picture cache 127 for use by the decoding engine 124 when decoding later-received coded video. The reference picture cache 127 may have a predetermined cache depth that matches the depth of the reference picture cache 117 of the coder 112.

The decoding engine 124 may perform decoding operations that invert coding operations performed by the coding engine 114 of the video coder 112. The decoding engine 124 may perform entropy decoding, dequantization and transform decoding to generate recovered pixel block data. Quantization/dequantization operations are lossy processes and, therefore, the recovered pixel block data likely will be a replica of the source pixel blocks that were coded by the video coder 112 but include some error. For pixel blocks coded predictively, the transform decoding may generate residual data; the decoding engine 124 may use motion vectors associated with the pixel blocks (which may be implied in some cases) to retrieve predicted pixel blocks from the reference picture cache 127 to be combined with the prediction residuals. Reconstructed pixel blocks may be reassembled into frames and output to the post-processor 126.

As discussed, the elements shown in FIG. 1—the camera 111, video coder 112, transmitter 119, video decoder 122 and display 128—all support delivery of video data in only one direction, from terminal 110 to terminal 120. The principles of the present invention may be extended to bidirectional exchange of video data, in which case these functional blocks may be replicated to support delivery of video data from terminal 120 to terminal 110, not shown in FIG. 1. Thus, the terminal 120 may include its own camera, video coder and transmitter and the terminal 110 may include its own video decoder and display. Although similarly provisioned, the video coder/decoder pairs may operate independently of each other. Therefore, pre-processing operations 113 and post-processing operations 126 of a first video coder/decoder pair 112/122 may be selected dynamically with regard to the video content being processed in one direction. Pre-processing operations and post-processing operations of a second video coder/decoder pair may be selected dynamically with regard to the video content being processed by the second pair and without regard to the video content being processed by the first pair 112/122.

The coding engine 114 and decoding engine 124 may process frames of video data according to any of a variety of coding techniques to achieve bandwidth compression (e.g., temporal and/or spatial predictive encoding). Using predictive coding techniques, a motion-compensated prediction algorithm reduces spatial and temporal redundancy in the video stream by exploiting spatial and temporal redundancies in a sequence of frames. As part of this coding, some frames or portions of frames in a video stream may be coded independently from any other frame (intra-coded I-frames). Other frames or portions thereof may be coded with reference to other previously-coded reference frames (inter-coded frames). For example, P-frames may be coded with reference to a single previously-coded frame and B-frames may be coded with reference to a pair of previously-coded frames. Generally speaking, it requires a larger amount of bits to code a frame as an I frame as compared coding the same frame as a P- or B-frame when adequate prediction references are available for coding. Inter-frame coding, therefore, generally achieves a higher level of compression and fewer bits per frame as compared to intra-coding.

Figure 2A:
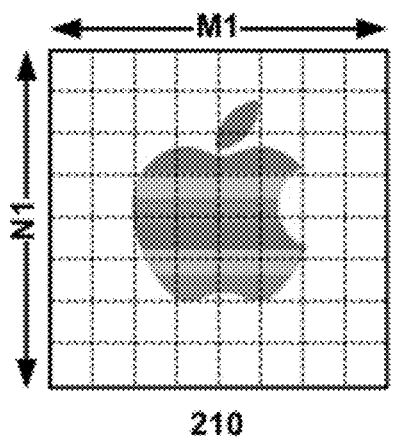
FIG. 2A is a simplified diagram of a single conventional frame from a video coding system.
Figure 2B:
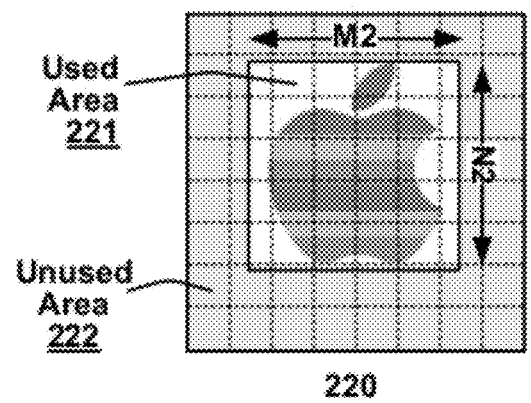
FIG. 2B is a simplified diagram of a single frame according to an embodiment of the present invention.

During pre-processing, the source video may be separated into a series of frames, each frame representing a still image of the video. FIGS. 2A and 2B illustrate exemplary frames 210, 220 of video data that may be processed according to embodiments of the present invention. In both cases, a coder may be capable of coding input frames 210, 220 of size M1×N1. At various times during a coding session, however, a coder may parse an input frame 220 into two regions—a limited use region 221 and a remainder region 222 that is unused—in response to constraints imposed on the coding system. The limited use region 221 may limit effective size of the input frame to a size (shown as M2×N2) that is less than the size of the input frames. In one embodiment, the coder may code the used region 221 but refrain from coding the unused area 222 of the frame. Alternatively, the coder may code both the used region 221 and the unused area 222 but apply lower complexity or lower quality coding to the unused area 222 than to the used region 221.

As indicated, the system may parse input frames into these limited use regions 221 and remainder regions 222 in response to constraints that are imposed on the coding system. For example, such constraints may be imposed when a coding session is established with a decoder that has a display size that is insufficient to render the full M1×N1 frame that is input to the coder. Alternatively, such constrains may be imposed when a coding session experiences channel errors that impair transmission at a first bit rate; the coder may parse input frames into limited use regions 221 and remainder regions 222 in an effort to code the use regions 221 at high quality to the detriment of the remainder regions 222. In another example, such constraints may be imposed when the available network bandwidth between the coder and the decoder may be limited; the coder may parse input frames into limited use regions 221 and remainder regions 222 in order to minimize the bits transmitted to the decoder for the remainder regions 222.

In an embodiment, the coder may be restricted to coding frames of a fixed size M1×N1 due to hardware limitations of the coder. For example, the coding engine 114, decoder 118 and reference picture cache 117 may be provided within an integrated circuit that has limited coding modes. For example, it may accept input frames of a limited number of sizes (e.g., M1×N1). Therefore, the integrated circuit may not be able to provide flexibility to code input frames of arbitrary size. In such implementations, as explained above, the system 100 may parse the M1×N1 frames into different regions and cause the integrated circuit to code them differently. For example, the system 100 may cause the used area 221 of size M2×N2 to be coded with high quality. The system 100 may cause the unused area 222 to be coded with much lower quality. For example, the system 100 may cause quantization parameters associated with portions of the unused area 222 to be increased dramatically as compared to those of the used area 221, which increases compression and lowers image quality of the unused area 222. Alternatively, a preprocessing operation may filter portions of the unused area 222 at much stronger filtering levels than the used area 221 before it is input to the coding engine 114, which degrades quality of the unused area 222 but allows the coding engine 114 to code the unused area 222 with higher compression than the used area 221. In another embodiment, a preprocessing operation may mask out image data of the unused area 222, replacing it for example with entirely white, entirely gray or entirely black image data, which again permits the coding engine 114 to code the unused area 222 with high compression.

The coder and decoder may communicate whether certain portions of a frame should be coded/decoded either during initial handshake routines between the coder and decoder, or during the transmission of coded data from the coder to the decoder. In an embodiment, the decoder may communicate an indicator via a back channel to the coder to indicate the size of the used area 221 of the frame and/or the location of the used area 221. In another embodiment, the coder may determine a size and/or location of the used area 221 based on factors such as network congestion and channel errors.

In one embodiment, frames 210, 220 may be divided into pixel blocks as a basis of video coding. Pixel blocks may represent regular arrays of pixel data, for example, 8×8 pixel arrays, 16×16 pixel arrays or 4×8 pixel arrays. The sizes and distributions of the pixel blocks may be dictated by the coding protocols under which the coder and decoder operate, for example, MPEG-2, H.263, H.264 and the like In an embodiment, boundaries between used and unused areas 221, 222 may be aligned to boundaries of the pixel blocks within the frames.

The frames 210, 220 may be coded and transmitted at a first resolution and scaled to a second resolution at the decoder. For example, the coder may code VGA frames and transmit those frames on the channel to the decoder. However, the decoder may only utilize a qVGA display. Then, part of the data coded and transmitted to the decoder may not be displayed at the decoder. Where the full frame size is M1×N1, the used area 221 may be limited to M2×N2. The M2×N2 area of the frame may be predetermined, and the used area limitations may be exchanged between a coder and a decoder during initial handshake routines.

In an embodiment, a coder may be constrained by the M2×N2 size of the used area 221, but may not be restricted to a particular location for the used area 221. Then the coder may identify foreground or other interesting objects such as faces and limit the used area to a detected M2×N2 area. Then the coder may notify the decoder of the region of the used area by including the (x,y) coordinates of the first corner of the used area 221 in the metadata transmitted with the coded video frame to the decoder.

The unused area 222 of the frame 220 will not be displayed and any distortion in the unused area 222 of the frame 220 will not be visible. Thus, lower complexity coding modes may be sufficient to code the unused and un-needed data for transmission. However, when the frame 220 is used as a reference for other inter-coded frames, in an embodiment, the unused area 222 may be utilized in the reconstruction of those frames, for example, as a reference for a pixel block exhibiting motion from the unused portion 222 of the reference frame 220 to the used portion of the current frame. Therefore, the data in the unused area 222 cannot be simply dropped in certain circumstances, but must be transmitted from coder to decoder.

In another embodiment, when the predictive coding is limited to the used area 221 of a reference frame 220, the data in the unused area 222 will not be referenced and need not be reconstructed or coded. Thus, a pre-processor may fill the unused area 222 with gray, white, or black pixels that are cheap to code and to transmit.

Figure 3:
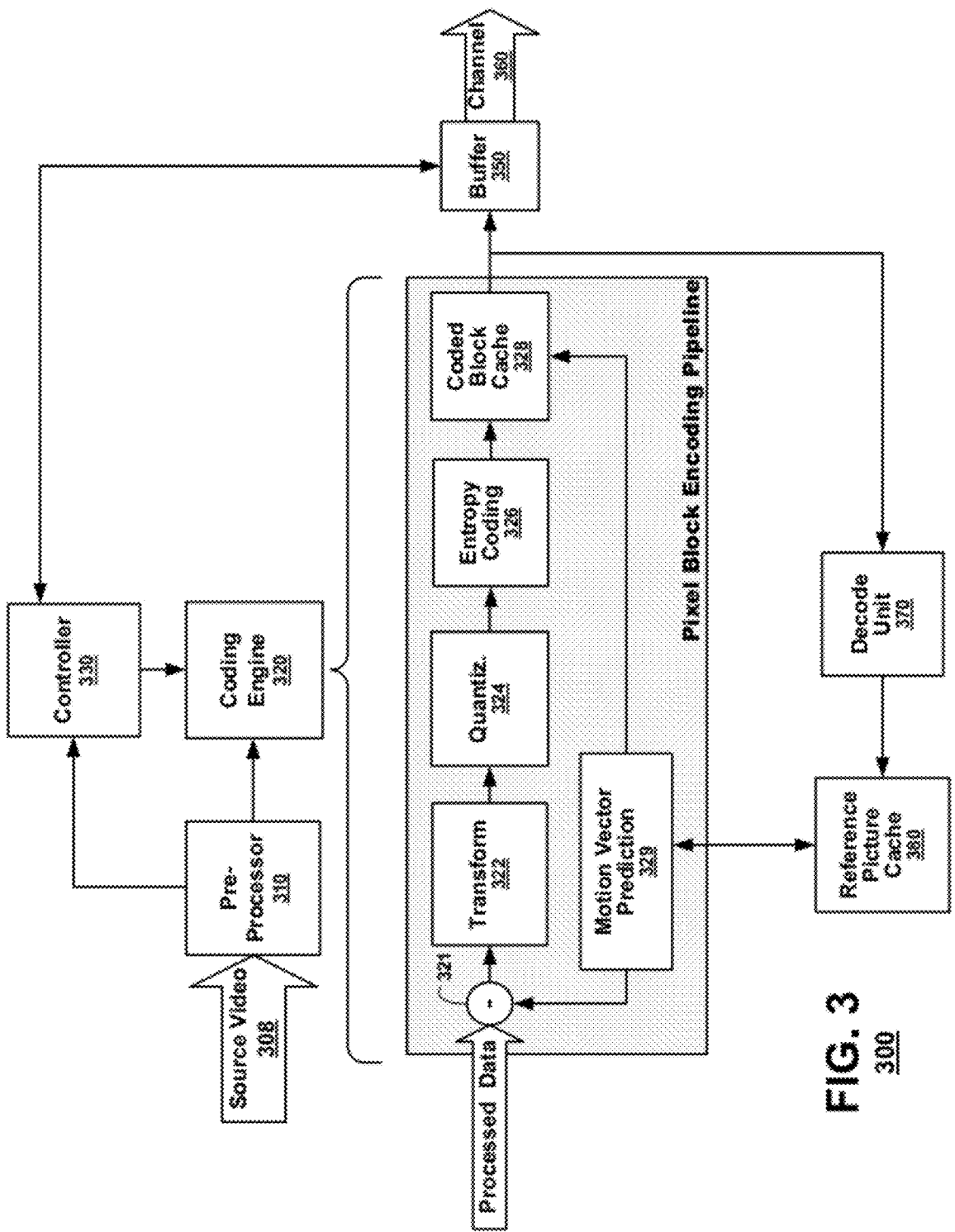
FIG. 3 is a simplified block diagram of a video coder according to an embodiment of the present invention.

FIG. 3 is a simplified block diagram of a video coder 300 according to an embodiment of the present invention. The coder 300 may include a pre-processor 310, a coding engine 320, a controller 330, a buffer 350, a decode unit 370, and a reference picture cache 380. The pre-processor 310 may receive the input video data from the video source 308, such as a camera or storage device, separate the video data into frames, and prepare the frames for coding. The coding engine 320 may receive video output from the pre-processor 310 and generate compressed video in accordance with coding mode parameters received from the controller 330. The buffer 350 may store the coded data until it is combined into a common bit stream to be delivered by a transmission channel 360 to a decoder or terminal. The decoding unit 370 may reconstruct the compressed video. The reference frame cache 380 may store reconstructed frame data to be used as sources of prediction for later-received frames input to the coder 300.

The controller 330 may receive the processed frames from the preprocessor 310 and determine appropriate coding modes for the processed frames. For each pixel block in a frame, the controller 330 may select a coding mode to be utilized by the coding engine 320 and may control operation of the coding engine 320 to implement each coding mode by setting operational parameters.

In an embodiment, the controller 330 may determine that a portion of a frame is unused where the network bandwidth is limited, via a communication from a decoder on a back channel, or the coder may receive information about the decoder capabilities during an initial handshake procedure wherein the capabilities of each terminal are exchanged. In an embodiment, if the area information changes between frames, for example, because of a change in channel conditions, the new area information, including the portions of the frame that are unused, may be included with the coded video data and transmitted to a decoder.

In an embodiment, for pixel blocks in an unused area of the frame, the controller 330 may designate a low complexity coding mode. The selected low complexity coding mode may be 'skip mode' for inter-coded frames or directional prediction for intra-coded frames. Skip mode may mark blocks to be copied into a reconstructed frame from a reference frame without change or other coding. A skip mode coded pixel block may be directly copied from the reference frame into the reconstructed frame, or may be coded with an implied motion vector as determined by evaluating the neighboring pixel blocks in the frame. The forced selection of a low complexity coding mode may eliminate several coding steps that are unnecessary for unused portions of a frame.

The coding engine 320 may include a subtractor 321, a transform unit 322, a quantizer unit 324, an entropy coder 326, a coded block cache 328, and a motion predictor 329. The subtractor 321 may generate data representing a difference between the source pixel block and a reference pixel block developed for prediction. The subtractor 321 may operate on a pixel-by-pixel basis, developing residuals at each pixel position over the pixel block. The transform unit 322 may convert the source pixel block data to an array of transform coefficients, such as by a discrete cosine transform (DCT) process or a wavelet transform. The quantizer unit 324 may quantize (divide) the transform coefficients obtained from the transform unit 322 by a quantization parameter Qp. The entropy coder 326 may code quantized coefficient data by run-value coding, run-length coding or the like. Data from the entropy coder 326 may be output to the channel 360 as coded video data of the pixel block. The motion predictor 329 may search the reference picture cache 380 for stored decoded frames that exhibit strong correlation with the source pixel block. When the motion predictor 329 finds an appropriate prediction reference for the source pixel block, it may generate motion vector data that is output to a decoder as part of the coded video data stream.

In an embodiment, a pixel block from a used area 221 of a frame being coded may refer pixel blocks from an unused area 222 of a reference frame as a source of prediction. When pixel blocks from an unused portion of the frame may be referenced, the unused area of the reference frame may be reconstructed according to predictive coding techniques. In an embodiment, the motion vectors utilized to accommodate motion prediction may be limited to the used area of a reference frame. Then, the conventional reconstruction steps for the unused area may be eliminated entirely and the unused area may be filled with white, gray or black pixels as a pre-processing operation.

The coding engine 320 may operate according to a predetermined protocol, such as H.263, H.264, MPEG-2. In its operation, the coding engine 320 may perform various compression operations, including predictive coding operations that exploit temporal and spatial redundancies in the input video sequence. The coded video data, therefore, may conform to a syntax specified by the protocol being used.

Figure 4:
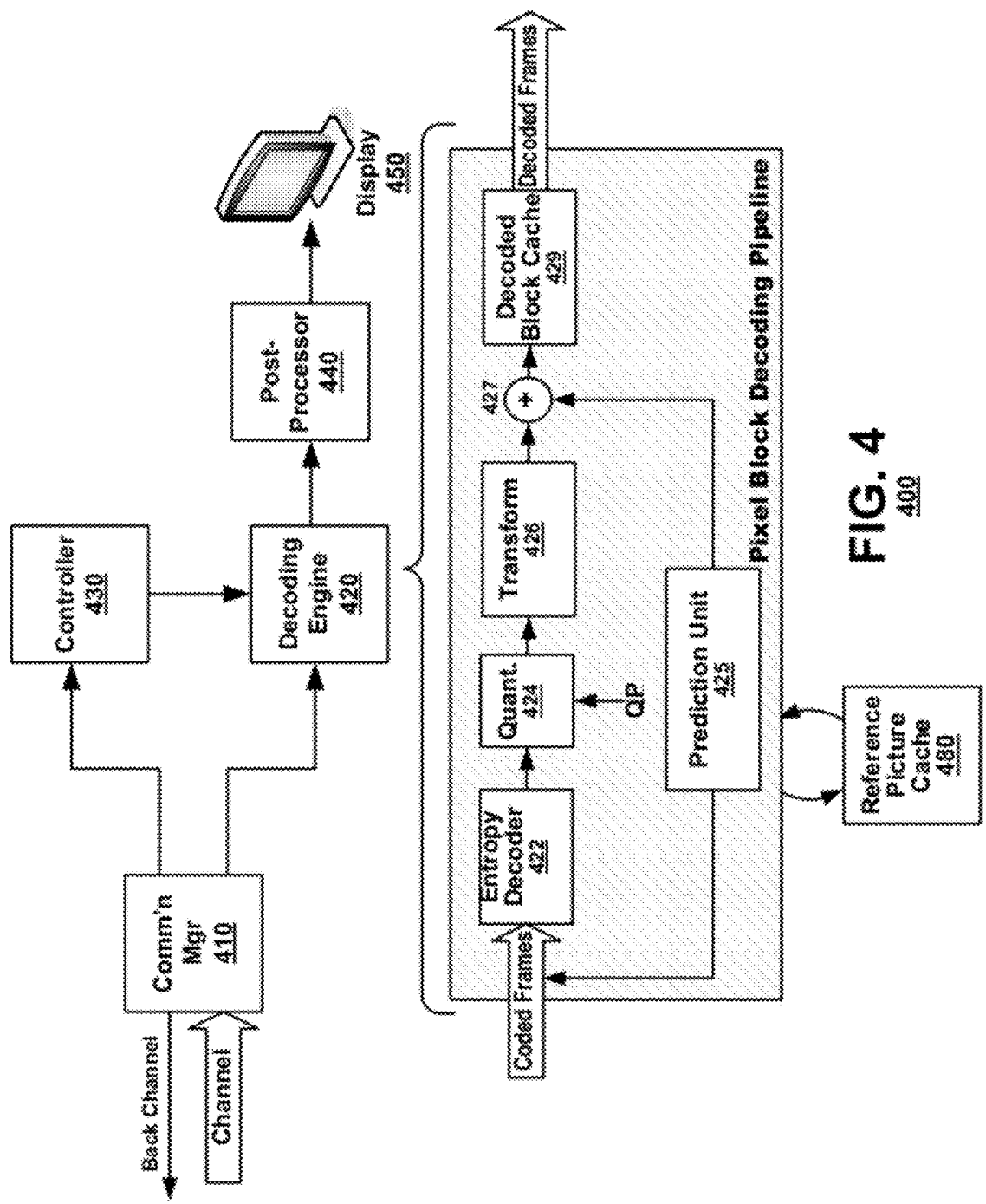
FIG. 4 is a simplified block diagram of a video decoder according to an embodiment of the present invention.

FIG. 4 is a simplified block diagram of a video decoder 400 according to an embodiment of the present invention. The decoder may include a communication manager 410, a decoding engine 420, a controller 430, a post-processor 440, and a reference picture cache 480. The communication manager 410 may receive video data from a channel and pass the video data to the decoding engine 420. The controller 430 may manage the operation of the decoder 400. The decoding engine 420 may receive coded/compressed video signals from the communication manager 410 and instructions from the controller 430 and may decode the coded video data based on prediction modes identified therein. The post-processor 440 may apply further processing operations to the reconstructed video data prior to display. This may include further filtering, de-interlacing, or scaling the recovered video frames. The reference picture cache 480 may store reconstructed reference frames that may be used by the decoding engine during decompression to recover P-frames, B-frames, or I-frames.

The communication manager 410 may transmit acknowledgment messages for successfully transmitted frames or display limitations indicating the area of the received frames that the decoder can display on a back channel to the coder.

The controller 430 may determine the size of a frame's used area and provide instruction to the decoding engine 420 regarding the frame. In an embodiment, where the used area of a received frame is not set by the limitations of the decoder 400, or otherwise remains constant, the controller 430 may determine the used area of a received frame by detecting the area information transmitted with the frame to the decoder. This may include the frame coordinates of the first corner of the used area, and the size of the M2×N2 used area of the frame.

The decoding engine 420 may include an entropy decoder 422, a quantization unit 424, a transform unit 426, a prediction unit 425, and an adder 427. The entropy decoder 422 may decode the coded frames by run-value or run-length or similar coding for decompression to recover the truncated transform coefficients for each coded frame. The quantization unit 424 may multiply the transform coefficients by a quantization parameter to recover the coefficient values. The transform unit 426 may convert the array of coefficients to frame or pixel block data, for example, by a discrete cosine transform (DCT) process or wavelet process. The prediction unit 425 may select a decoding mode to be applied to an input coded pixel block as directed by metadata from the channel and may generate decoded predicted pixel block data therefor. The adder 477 may generate data representing a sum between the residual pixel block and the predicted pixel block provided by the prediction unit 425. The adder 427 may operate on a pixel-by-pixel basis.

The prediction unit 425 may replicate operations performed by the prediction unit of the coder (FIG. 3). For I decoding, the prediction unit 475 may utilize decoded pixel block data of a pixel block from the same frame as the input pixel block as the predicted pixel block. For P and B decoding, the prediction unit 425 may utilize reconstructed data selected from a single reference frame or averaged from a pair of reference frames as the predicted pixel block. The prediction unit 425 may utilize metadata supplied by the coder, identifying reference frame(s) selected for prediction and motion vectors identifying locations within the reference frames from which the predicted pixel blocks are derived.

The decoding engine 420 may receive coded video signals from the communication manager 410 and instructions from the controller 430 as to the used area of the frames and parse the coded video data to recover the original source video data by decompressing the coded video signals. The decoding mode may be restricted to low complexity decoding modes for pixel blocks in the unused area of the received frame. The decoded frames or pixel blocks may then be output from the decoding engine.

In an embodiment, the motion vectors utilized to accommodate motion prediction may be limited to the used area of a reference frame. The controller 430 may limit the reference area of a reference frame used for predictive decoding to the used portion of a reference frame. This limitation may be determined by a flag transmitted with the coded video data, or predetermined during the preliminary exchange of capabilities between a coder and the decoder 400 during the initial handshake. Then the pixel blocks in the unused area need not be decoded and reconstructed but may be filled with white, gray or black pixels as a post-processing operation.

Figure 5:
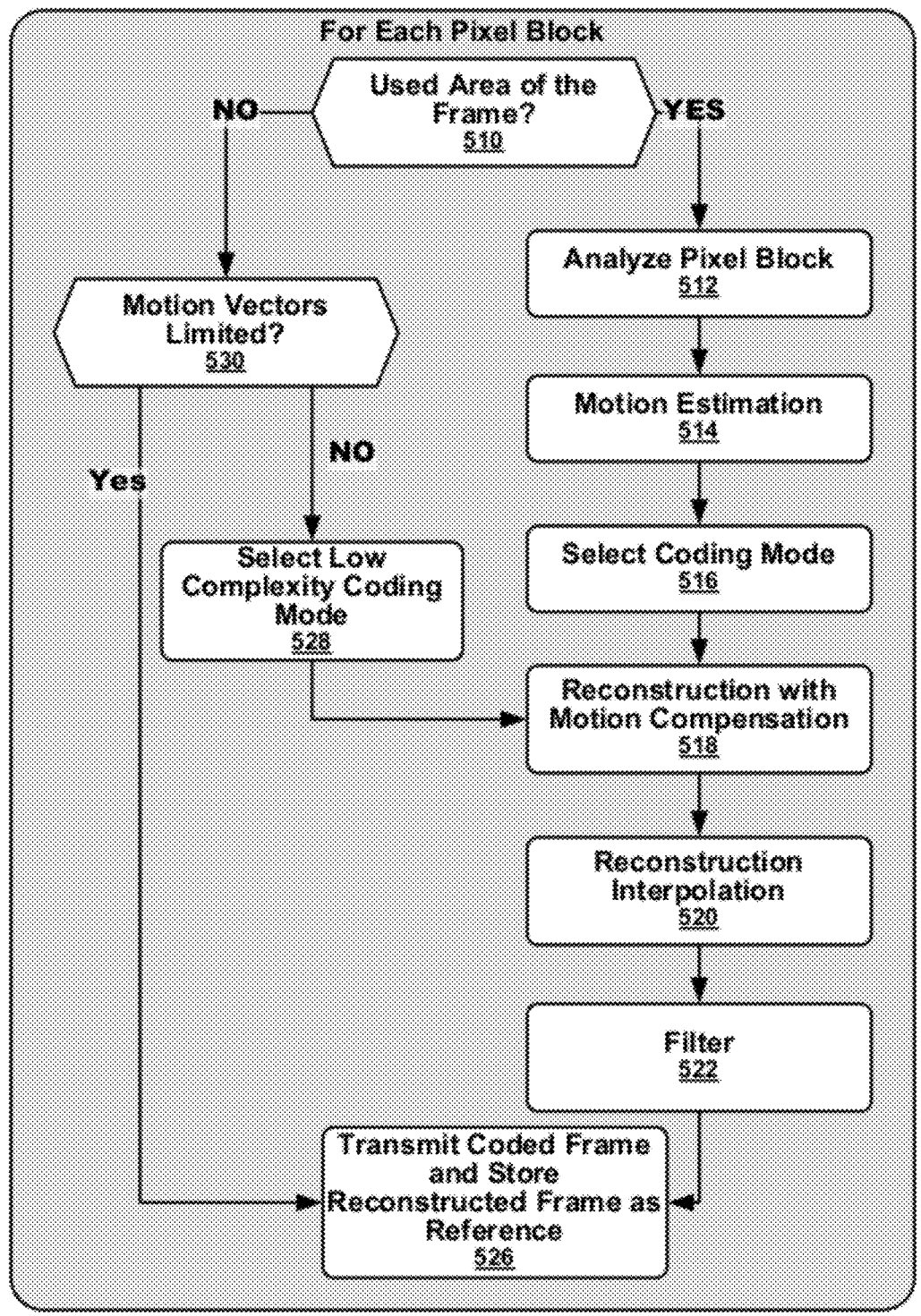
FIG. 5 is a simplified flow diagram illustrating a method to predictively code frames according to an embodiment of the present invention.

FIG. 5 is a simplified flow diagram illustrating a method to predictively code frames (e.g. P- or B-frames) according to an embodiment of the present invention. For each pixel block of a currently coded frame, the method 500 may check if the pixel block is in a used area of the frame (box 510). If the pixel block is in a used area, the pixel block may be coded conventionally. Specifically, the pixel block may be analyzed to determine characteristics of the frame that may inform the coding mode decision (box 512). For example, the pixel block may be analyzed for content, brightness, complexity, etc. The pixel motion vectors for the pixel block may be calculated (box 514). A motion vector may be generated by identifying relative motion between the current pixel block and a reference pixel block of a reference frame. A coding mode may then be selected (box 516). Any of several known methods for selecting a coding mode may be implemented. The coded frame may then be reconstructed for use as a reference frame (box 518). Reconstruction may include motion compensation to adjust for detected motion between a reference pixel block and the current pixel block. Reconstruction may additionally include interpolation wherein portions of the pixel block may be interpolated from neighboring or other reference pixel blocks (box 520). The coded pixel data may then be loop filtered to minimize noise in the reconstructed frame (box 522).

If the pixel block is in a unused area of the frame, the method may check if the motion vectors for the sequence of frames are limited to the used areas of the reference frames (box 530). If the motion vectors for the sequence of frames are limited to the used areas of the reference frames, the unused portions of the frame need not be coded or reconstructed and steps 512-522 may be eliminated. Then the unused area of the reference frame may be filled by a pre-processor with white, gray or black pixel blocks that are cheap to code and transmit. If the motion vectors for the sequence of frames are not limited to the used areas of the reference frames a low complexity coding mode may be selected (box 528), and coding steps, including at least steps 512-516 may be eliminated. However, the complete frame may still be reconstructed (boxes 518-520).

The coded pixel block may be prepared for transmission on the channel to a decoder and the reconstructed frame may be stored as a reference frame for future prediction (box 526). This may include buffering the pixel block and appending additional information to the transmitted frame, including, for example, the used area of the frame or an indication that the motion vectors are limited to the used portions of the reference frames.

In an embodiment, the selected low complexity coding mode (box 528) may be a 'skip mode' wherein pixel blocks from a reference frame are directly copied into the reconstructed frame without regard to the quality of the pixel blocks in the unused area.

In an embodiment, pixel blocks in the unused area may be required for coding pixel blocks in the used areas, for example, when a pixel block in the unused area but bordering the used area is utilized during interpolation or intra-frame predictive coding techniques. Then those required pixel blocks may be coded according to the conventional methods, i.e., without skipping any steps.

Figure 6:
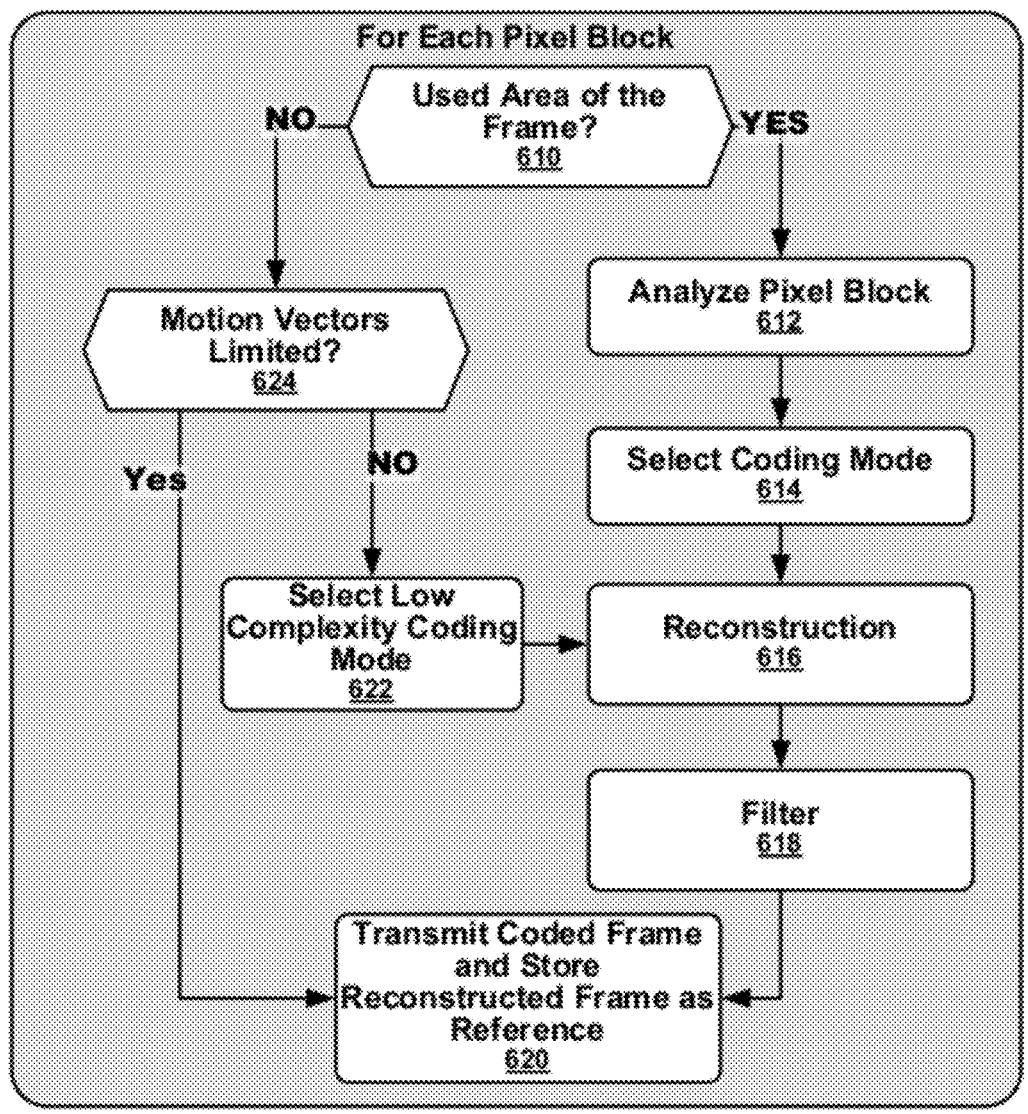
FIG. 6 is a simplified flow diagram illustrating a method to code I-frames according to an embodiment of the present invention.

FIG. 6 is a simplified flow diagram illustrating a method 600 to code I-frames according to an embodiment of the present invention. For each pixel block of a currently coded frame, the method 600 may check if the pixel block is in a used area of the frame (box 610). If the pixel block is in a used area, the pixel block may be coded conventionally. Specifically, the pixel block may be analyzed to determine characteristics of the frame that may inform the coding mode decision (box 612). For example, the pixel block may be analyzed for content, brightness, complexity, etc. A coding mode may then be selected (box 614). The coded frame may then be reconstructed for use as a reference frame (box 616). Reconstruction may include interpolation wherein portions of the pixel block may be interpolated from neighboring or other reference pixel blocks. The coded pixel data may then be loop filtered to minimize noise in the reconstructed frame (box 618).

If the pixel block is in a unused area of the frame, the method 600 may then check if the motion vectors for the sequence of frames are limited to the used areas of the reference frames (box 624). If the motion vectors for the sequence of frames are limited to the used areas of the reference frames, the unused portions of the frame may not be coded or reconstructed and steps 612-618 may be eliminated. Then the unused area of the reference frame may be filled by a preprocessor with gray or black pixel blocks that are cheap to code and transmit. If the motion vectors for the sequence of frames are not limited to the used areas of the reference frames, a low complexity coding mode may be selected (box 622), and coding steps, including at least steps 612-614 may be eliminated. However, the complete frame may still be reconstructed (box 616).

The coded pixel block may be prepared for transmission on the channel to a decoder and the reconstructed frame may be stored as a reference frame for future prediction (box 620). This may include buffering the pixel block and appending additional information to the transmitted frame, including, for example, the used area of the frame or an indication that the motion vectors are limited to the used portions of the reference frames.

In an embodiment, the selected low complexity coding mode (box 622) may be a directional prediction coding mode.

The foregoing discussion identifies functional blocks that may be used in video coding systems constructed according to various embodiments of the present invention. In practice, these systems may be applied in a variety of devices, such as mobile devices provided with integrated video cameras (e.g., camera-enabled phones, entertainment systems and computers) and/or wired communication systems such as videoconferencing equipment and camera-enabled desktop computers. In some applications, the functional blocks described hereinabove may be provided as elements of an integrated software system, in which the blocks may be provided as separate elements of a computer program. In other applications, the functional blocks may be provided as discrete circuit components of a processing system, such as functional units within a digital signal processor or application-specific integrated circuit. Still other applications of the present invention may be embodied as a hybrid system of dedicated hardware and software components. Moreover, the functional blocks described herein need not be provided as separate units. For example, although FIG. 1 illustrates the components of video coders and video decoders as separate units, in one or more embodiments, some or all of them may be integrated and they need not be separate units. Such implementation details are immaterial to the operation of the present invention unless otherwise noted above.

Further, the figures illustrated herein have provided only so much detail as necessary to present the subject matter of the present invention. In practice, video coders typically will include functional units in addition to those described herein, including audio processing systems, buffers to store data throughout the coding pipelines as illustrated and communication transceivers to manage communication with the communication network and a counterpart decoder device. Such elements have been omitted from the foregoing discussion for clarity.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method, comprising:
exchanging signaling with a decoder to define an effective size of frames;
parsing an input frame into a used area corresponding to the effective size and an unused area outside the effective size;
for each pixel block of the input frame, determining whether the pixel block is in the used area of the frame;
coding pixel blocks of the used area according to motion compensated prediction;
determining if motion vectors of the input frame are limited to used areas of reference frames;
if motion vectors of the input frame are not limited to the used areas of the reference frames, coding pixel blocks in the unused area of the input frame using a coding mode having a complexity level lower than used to code pixel blocks in the used area of the input frame; and
if the motion vectors of the input frame are limited to the used areas of the reference frames, at least one of: not coding pixel blocks in the unused area of the input frame, or filling the unused area of the input frame with predetermined pixels and coding the filled unused area.

2. The method of claim 1, further comprising:
reconstructing the input frame by reconstructing the coded pixel blocks in the unused area and the coded pixel blocks in the used area; and
storing the reconstructed frame as a reference frame.

3. The method of claim 2, wherein the reconstructing the input frame includes interpolating the reconstructed pixel blocks based on neighboring pixel blocks.

4. The method of claim 2, wherein the used area of the input frame is inter-coded, and reconstructing the input frame includes motion compensation.

5. The method of claim 1, wherein identification of the unused areas of the frames and prediction modes for the unused areas is based on network congestion.

6. The method of claim 1, wherein identification of the unused areas of the frames and prediction modes for the unused areas is based on channel errors.

7. The method of claim 1, wherein the used area of the input frame is inter-coded, and the coding of the pixel blocks in the unused area of the input frame includes directly copying pixel blocks from a reference frame.

8. The method of claim 1, wherein the used area of the input frame is intra-coded, and the coding of the pixel blocks in the unused area of the input frame is directional prediction coding.

9. A video coding method, comprising:
receiving signaling from a decoder to at least partially define an initial size of frames to be coded during a video coding session;
coding frames of the video coding session according to predictive coding techniques, the frames matching the initial size;
at some point during the video coding session, receiving signaling from the decoder to at least partially define an effective size of frames to be coded, the effective size of the frames being smaller than the initial size and corresponding to a used area of the frames displayed by an apparatus connected to the decoder, an area of the frames outside the effective size corresponding to an unused area not displayed by the apparatus; and after the effective size is defined, coding subsequently-processed frames according to predictive coding techniques, the frames matching the initial size, comprising:
determining if motion vectors of the input frame are limited to areas inside effective sizes of reference frames;
if motion vectors of the input frame are not limited to the areas inside effective sizes of the reference frames, coding pixel blocks outside an area of the effective size of the input frame using a coding mode having a complexity level lower than used to code pixel blocks inside the area of the effective size of the input frame, wherein image content of the coded frames in the area outside the effective size has a reduced image quality as compared to image content in the area inside the effective size.

10. The method of claim 9, wherein the image content of the frames in the area outside the effective size is filtered differently than the image content of the frames in the area inside the effective size.

11. The method of claim 9, wherein the image content of the frames in the area outside the effective size is coded with a higher quantization parameter than the image content of the frames in the area inside the effective size.

12. The method of claim 9, wherein the image content of the frames in the area outside the effective size is replaced by other content.

13. The method of claim 9, wherein at least one of the initial size or the effective size is a function of bandwidth of a network between a coder performing the coding and the decoder.

14. The method of claim 9, wherein at least one of the initial size or the effective size is a function of congestion of a network between a coder performing the coding and the decoder.

15. The method of claim 9, wherein at least one of the initial size or the effective size is a function of errors in a channel between the coder performing the coding and the decoder.

16. A coding apparatus, comprising:
a controller to:
parse an input frame into a used area corresponding to an effective size and an unused area outside the effective size, the effective size at least partially defined based on signaling received from a decoder,
for each pixel block of the input frame, determine whether the pixel block is in the used area of the frame;
determine if motion vectors of the input frame are limited to used areas of reference frames;
a pre-processor to:
if motion vectors of the input frame are limited to the used areas of the reference frames, fill the unused area of the input frame with predetermined pixels; and
a coding engine to:
code pixel blocks of the used area according to motion compensated prediction,
if motion vectors of the input frame are not limited to the used areas of the
reference frames, code pixel blocks in the unused area of the input frame using a coding mode having a complexity level lower than used to code pixel blocks in the used area of the input frame, and
if the motion vectors of the input frame are limited to the used areas of the reference frames, at least one of: not code pixel blocks in the unused area of the input frame, or code the unused area filled by the pre-processor.

17. The apparatus of claim 16, further comprising:
a decoding engine to reconstruct the input frame by reconstructing the coded pixel blocks in the unused area and the coded pixel blocks in the used area; and
a reference picture cache to store the reconstructed frame as a reference frame.

18. The apparatus of claim 17, wherein the decoding engine is further configured to interpolate the reconstructed pixel blocks based on neighboring pixel blocks.

19. The apparatus of claim 17, wherein the used area of the input frame is inter-coded, and the decoding engine is further configured to reconstruct the input frame using motion compensation.

20. The apparatus of claim 16, wherein identification of the unused areas of the frames and prediction modes for the unused areas is based on network congestion.

21. The apparatus of claim 16, wherein identification of the unused areas of the frames and prediction modes for the unused areas is based on channel errors.

22. The apparatus of claim 16, wherein the used area of the input frame is inter-coded, and the coding of the pixel blocks in the unused area of the input frame includes directly copying pixel blocks from a reference frame.

23. The apparatus of claim 16, wherein the used area of the input frame is intra-coded, and the coding of the pixel blocks in the unused area of the input frame is directional prediction coding.

24. A coding apparatus, comprising:
a controller to:
determine an initial size of frames to be coded during a video coding session based on signaling received from a decoder, and
at some point during the video coding session, determine an effective size of frames to be coded based on signaling received from the decoder, the effective size of the frames being smaller than the initial size and corresponding to a used area of the frames displayed by an apparatus connected to the decoder, an area of the frames outside the effective size corresponding to an unused area not displayed by the apparatus; and
a coding engine to:
prior to when the effective size is defined, code frames of the video coding session according to predictive coding techniques, the frames matching the initial size, and
after the effective size is defined, code subsequently-processed frames according to predictive coding techniques, the frames matching the initial size, comprising:
determining if motion vectors of the input frame are limited to areas inside effective sizes of reference frames;
if motion vectors of the input frame are not limited to the areas inside effective sizes of the reference frames, coding pixel blocks outside an area of the effective size of the input frame using a coding mode having a complexity level lower than used to code pixel blocks inside the area of the effective size of the input frame, wherein image content of the coded frames in the area outside the effective size has reduced image quality as compared to image content in the area inside the effective size.

25. The apparatus of claim 24, further comprising a filter to filter the image content of the frames in the area outside the effective size differently than the image content of the frames in the area inside the effective size.

26. The apparatus of claim 24, wherein the coding engine is further configured to code image content of the frames in the area outside the effective size with a higher quantization parameter than the image content of the frames in the area inside the effective size.

27. The apparatus of claim 24, further comprising a preprocessor to replace image content of the frames in the area outside the effective size with other content.

28. A storage device having program instructions, which when executed by a processor perform a method, the method comprising:
   exchanging signaling with a decoder to define an effective size of frames;
   parsing an input frame into a used area corresponding to the effective size and an unused area outside the effective size;
   for each pixel block of the input frame, determining whether the pixel block is in the used area of the frame;
   coding pixel blocks of the used area according to motion compensated prediction; determining if motion vectors of the input frame are limited to used areas of reference frames;
   if motion vectors of the input frame are not limited to the used areas of the reference frames, coding pixel blocks in the unused area of the input frame using a coding mode having a complexity level lower than used to code pixel blocks in the used area of the input frame; and
   if the motion vectors of the input frame are limited to the used areas of the reference frames, at least one of: not coding pixel blocks in the unused area of the input frame, or filling the unused area of the input frame with predetermined pixels and coding the filled unused area.

29. A storage device having program instructions that, when executed by a processor perform a method, the method comprising:
   receiving signaling from a decoder to at least partially define an initial size of frames to be coded during a video coding session;
   coding frames of the video coding session according to predictive coding techniques, the frames matching the initial size;
   at some point during the video coding session, receiving signaling from the decoder to at least partially define an effective size of frames to be coded, the effective size of the frames being smaller than the initial size and corresponding to a used area of the frames displayed by an apparatus connected to the decoder, an area of the frames outside the effective size corresponding to an unused area not displayed by the apparatus; and
   after the effective size is defined, coding subsequently-processed frames according to predictive coding techniques, the frames matching the initial size, comprising:
      determining if motion vectors of the input frame are limited to areas inside effective sizes of reference frames;
      if motion vectors of the input frame are not limited to the areas inside effective sizes of the reference frames, coding pixel blocks outside an area of the effective size of the input frame using a coding mode having a complexity level lower than used to code pixel blocks inside the area of the effective size of the input frame, wherein image content of the coded frames in the area outside the effective size has reduced image quality as compared to image content in the area inside the effective size.

* * * * *